United States Patent
Kurumizawa

(12) 
(10) Patent No.: US 6,623,274 B2
(45) Date of Patent: Sep. 23, 2003

(54) NETWORK FARMING METHOD FOR CUSTOMERS WHO INSTRUCT GROWING CONDITIONS AND RECEIVE HARVEST

(75) Inventor: Takahiro Kurumizawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/859,485

(22) Filed: May 18, 2001

(65) Prior Publication Data

US 2001/0044097 A1 Nov. 22, 2001

(30) Foreign Application Priority Data

May 19, 2000 (JP) ........................................ 2000-148794

(51) Int. Cl.$^7$ ............................................... G09B 19/00
(52) U.S. Cl. ......................................................... 434/225
(58) Field of Search ............................. 702/2; 705/1, 4, 705/37; 434/225

(56) References Cited

U.S. PATENT DOCUMENTS 6,064,943 A * 5/2000 Clark et al. ................... 702/2
6,269,361 B1 * 7/2001 Davis et al. ................... 702/2
6,327,569 B1 * 12/2001 Reep .............................. 702/2

FOREIGN PATENT DOCUMENTS

JP 11134398 A * 5/1999 ........... G06F/17/60

* cited by examiner

Primary Examiner—Henry C. Yuen
Assistant Examiner—Hyder Ali
(74) Attorney, Agent, or Firm—Young & Thompson

(57) ABSTRACT

A customer is offered a realistic experience of growing and harvesting plants, flowers or fishes through instructions from the customer connected with a network. The home vegetable garden or the network farm includes customer terminals connected with a network and a management terminal connected with the network for receiving instructions from a customer and reporting the growing process of plants, flowers and fishes. The customer terminal decides a kind of farm, land, seed and fertilizer, and then transmits instructions on the basis of the decision. The management terminal receives the instructions, and executes the instructions for growing and harvesting the selected plants, flowers and fishes.

4 Claims, 4 Drawing Sheets

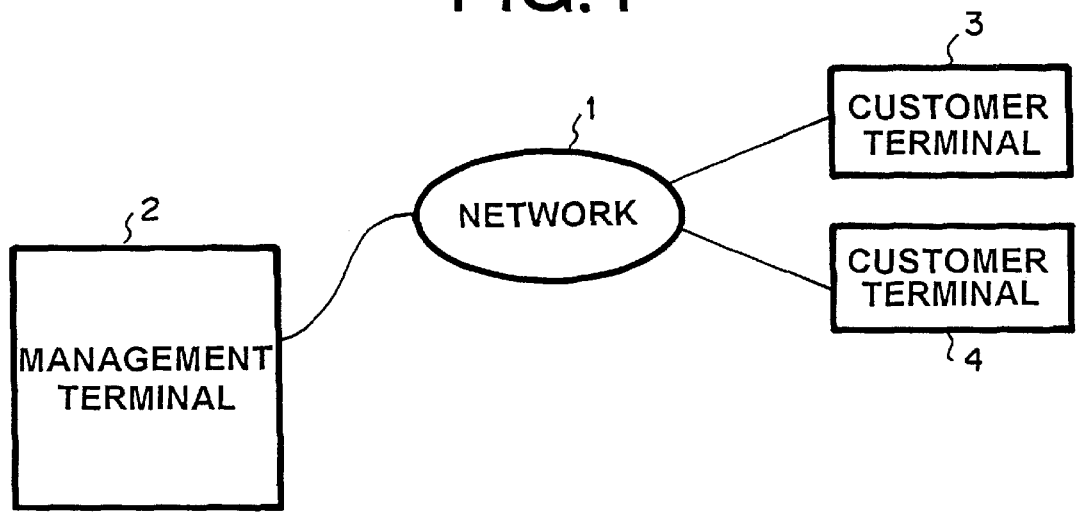
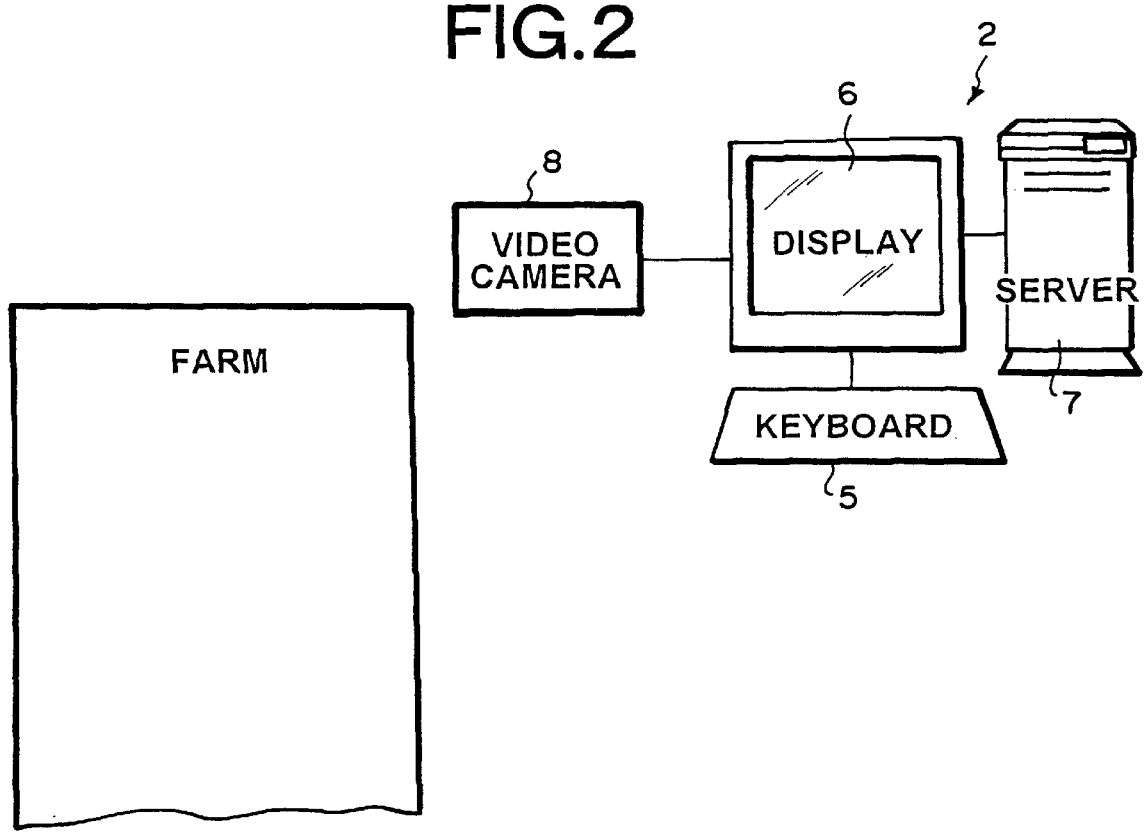

FIG.3 http://WWW.NOU.EN.ne.jp/SAIEN.

LET'S TRY NETWORK FARM

○ APPLE

○ CUCUMBER

○ RICE

○ POTATO

○ SUGAR CANE

○ WATER MELON

○ WHEAT

○ CONTRACT FEE ( START )

FIG.4 http://WWW.NOU.EN.ne.jp/SAIEN. RICE

SET UP GROWING CONDITIONS OF RICE

○ AREA OF FIELD [ ] m²

○ KIND OF SEED ○ KOSHIHIKARI ○ SASANISHIKI ○ NOHRINN NO. 1
OTHERS [ ]

○ DATE OF SOWING [ ] MONTH [ ] DAY

○ KIND AND QUANTITY OF FERTILIZER
○ ---- [ ] Kg
○ ---- [ ] Kg

○ TIMING OF TRANSPLANTING RICE SEEDLINGS [ ] MONTH [ ] DAY

○ METHOD OF TRANSPLANTING ○ DENSE ○ COARSE ( START )

NETWORK FARMING METHOD FOR CUSTOMERS WHO INSTRUCT GROWING CONDITIONS AND RECEIVE HARVEST

BACKGROUND OF THE INVENTION

1. Technical Field of the Invention

The present invention relates to a network system for a plantation or fish farm, wherein a user without materials and facilities for cultivating plants and breeding animals instructs through a network a cultivator and breeder.

2. Description of the Prior Art

It is known that a network farm shows photographs of its harvest on its internet home page, thereby delivering the harvest to customers.

Further, the network farm often gathers by using an internet home page customer members who wish to have virtual experiences in the farm. For example, the network farm lent an apple tree to a customer and delivers harvested apples to the customer with a report of how the apples are grown.

However, the customers are not fully satisfied merely by receiving the harvest. Particularly, eager customers wish to know that their plants are being grown in accordance with their instructions. On the other hand, when the farm could not obtain any harvest for the customer, the farm may deliver some harvest, feeling pity for the customer. In this way, the conventional network farm system has a disadvantage that the customers can not learn something from failures on harvest.

Recently, the governmental research center of the Japanese ministry of agriculture and fishery together with the federal organization of science and industry of Australia reportedly succeeded in generating a virtual rice plant which grows in a computer which shows by computer graphics a growing process from germination to coming into ears. For example, the way the leaves come out differs, if some of the growing conditions for the virtual rice plant are changed. Computer simulation is useful for development of new species. Further, the virtual rice plant ends its life for only a minute, although a real rice plant takes about five months for a harvest. Therefore, immediately after starting a software, seeds germinate, the leaves come out, old leaves fall, and at last ears come out. The way how the leaves and the timing when the ears come are changed, according to the conditions such as temperature or day light time. Therefore, the local conditions such as the East-North district in Main Island of Japan, or Kyushu Island in southern Japan can be simulated. A virtual irrigated rice field has been already prepared for cropping simultaneously several kinds of the virtual rice plants. The virtual irrigated rice field may be used for researching lengths of leaves and shapes of the stems which can grow against bad daylight conditions (morning edition of The Japan Economy: Heisei 12, May 8, 2000.

The virtual plant or plantation may be applied to offer experiences of trial and error for delivering a real harvest to a customer connected with a network.

SUMMARY OF THE INVENTION

An object of the present invention is to provide a network farm for growing plants, fishes or animals, wherein a user connected with a network instructs a farmer during growing processes for obtaining a real harvest.

The network farming method for customers who instruct growing conditions and receive harvest from a network farm system including a management terminal, a farm connected with said management terminal and a plurality of customer terminals, which comprises the steps of: deciding growing conditions in said customer terminals; transmitting said growing conditions from said customer terminals to said management terminal; executing growing in said farm connected with said management terminal; reporting growing processes and harvest from said farm; and delivering said harvest from said farm to said customer terminal.

According to the present invention, the customer can have hardships or difficulties in growing plants and animals and can get his/her own harvest.

Further, according to the present invention, the farming experiences are realistic, because the growing processes of plants and animals are monitored at any time.

BRIEF EXPLANATION OF THE DRAWINGS

FIG. 1 is a block diagram of a network farm for a network farming method for customers who instruct growing conditions and receive harvest.

FIG. 2 is a block diagram of a management terminal of a home vegetable garden of the network farm of the present invention.

FIG. 3 is an exemplary home page transmitted from the management terminal through the network.

FIG. 4 is another exemplary home page transmitted from the management terminal through the network.

PREFERRED EMBODIMENT OF THE INVENTION

Figure 5:
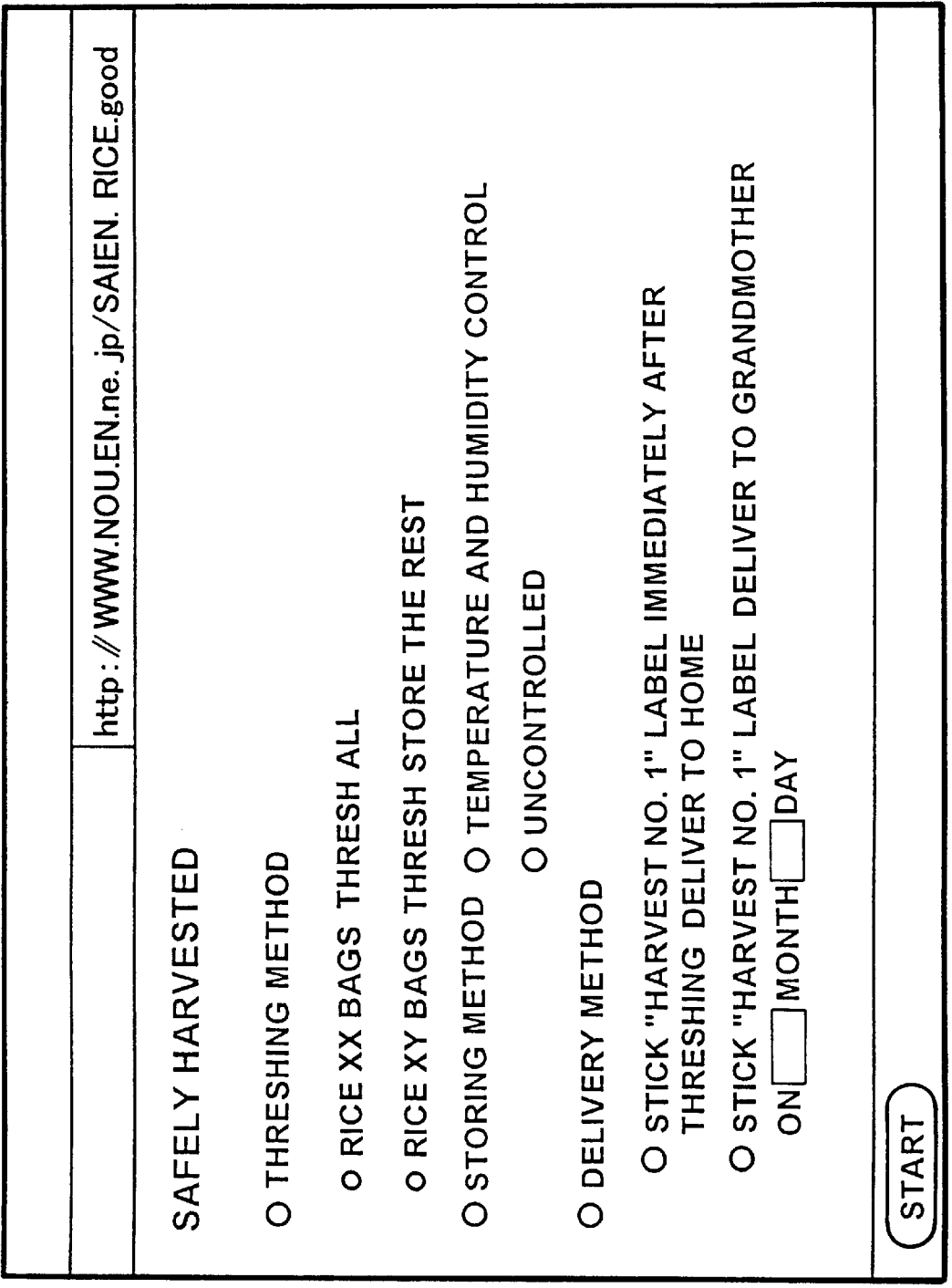
FIG. 5 is still another exemplary home page transmitted from the management terminal through the network.

A block diagram of the Internet remote instruction system is shown in FIG. 1. Network 1 such as the Internet, LAN and WAN is connected with home vegetable garden management terminal 2 which may include a home page, or e-mail means. Concretely, management terminal 2 may open its URL (uniform resource locator) and a home page, thereby introducing its business for home vegetable garden wherein management terminal 2 invites, like a TV shopping, customers, receives instructions for cultivation, undertakes harvest by the cultivation, and receives a compensation. Further, the URL may be connected with a server which can accept orders all day long. Further, a part of the server may be used for the home page. Furthermore, a contract between the management terminal and a customer may include a preparation of soil and a delivery of harvest. Furthermore, not only texts but also pictures of harvest are photographed by a video camera.

Customer terminals 3 and 4 are connected with the network. Customer terminal 3 or 4 includes a computer, memory, printer, keyboard and mouse, thereby reading the home page, answering questionnaires and buying the harvest or other products. Customer terminals 3 and 4 allow customers of the home vegetable garden to respond with freedom and variety reflecting their experiences and learning level.

Management terminal 2 manages a real facility where farmers actually grow plants and fishermen actually grow fishes. Therefore, the customers who operate customer terminals 3 and 4 may visit the facility.

Management terminal 2 as shown in FIG. 2 comprises: input unit 5 such as a keyboard and a mouse; server 7 for an operational program for controlling a computer, an application program for home page or the like, an image processing program for video camera images and a network program for transmitting home pages and the like; video camera 8 for photographing moving or still pictures of the facility and harvests or other things; and display 6 for displaying home pages, video images and other things. Concretely, video camera 8 may from time to time send images of flowers and fruits, thereby offering the video images to the customers through network 1. Video camera 8 may be replaced by a pocket telephone with a digital camera. In this case, the pocket telephone is connected with the computer in management terminal 2.

Customer terminals 3 and 4 are required to assure communication channel in order to send their instructions on the home pages of management terminal 2. Further, customer terminals 3 and 4 may be provided with a color printer, thereby enjoying vivid images from the facility. Further, customer terminal 3 or 4 may be a pocket telephone, a mobile information terminal, or a mobile personal computer which can be connected with network 1 such as the Internet.

Further, the customer can confirm a progress of execution of its instruction, if management terminal 2 sends an image of the instruction written, for example, on a board, together with scenes of cultivating or breeding in the facility.

Customer terminal searches by a browser a home page which meets its expectation concerning cultivation/breeding of plants/animals.

After finding out the expected home page, the customer asks for an execution of cultivation/breeding of plants/animals.

The customer instructs, for example, to begin home vegetable farm, looking at a home page as shown in FIG. 3. It is assumed that the customer selects "rice " among a list of crops including "apple" "cucumber" and "rice", responding to an invitation "Let's try network farm". The contents of the home page as shown in FIG. 3 are diversified and limitless in geographical conditions as to be attractive to customers.

An example of a home page as shown in FIG. 4 of which URL is different from that of the home page as shown in FIG. 3. One of the items is an area of farm to be contracted. If the contract fee proposed by the customer does not match the area of farm, the home page replies an advice such as "the area of farm should be smaller than xx m$^2$", for example. Next, the customer inputs in full detail a kind of seed, a sowing timing, a kind and quantity of fertilizer and a timing and method of transplanting the rice seedlings, and other things, taking into consideration the entire process of growing rice. A program for a farmer to comment on the growing conditions may be provided for the network farm system, when a condition proposed by the customer does not meet the actual condition of the farmer.

An initial display for setting up the growing conditions. The growing conditions may also be set up monthly or whenever necessary, while video pictures of growing processes may be sent to customers in a file attached to a electronic mail so that the customers can confirm the growing process.

For example, after transplanting rice seedlings, it may be instructed that released ducks weed the field, after transplanting rice seedlings. Other growing conditions may be changed, in accordance with a dry or wet weather.

The exemplary home page as shown in FIG. 5 notifies a customer of a safe harvest of rice for awaiting a next instruction. The customer instruct to thresh all or a part of straw bags of unhulled rice. The customer may instruct to threshing "xy" bags and store the balance in a storehouse if the farmer has one. The customer may select an air-conditioned room with constant temperature and/or humidity, or a room without air-conditioning.

Next, the customer instructs a delivery. The customer may request to deliver to his or her house all the rice immediately after threshed, when he or she wishes to touch the rice grown and harvested by his/her instructions. The farmer affixes a label "Harvest No. 1" to the bag of the rice. The farmer may send photographs of the labeled bag to the electronic mail server of the customer.

The customer can identify the delivered rice to be his/her own, by the electronic mail. In general, the threshed rice is further polished to be cleaned rice. Therefore, the customer may order the farmer to polish the threshed rice.

Alternatively, the customer may harvest, thresh, polish, according to his/her choice.

A harvest may be unsuccessful. Although a harvest is successful in the above explanation, it may be unsuccessful, due to inappropriate instructions on a kind of seed, sprinkling of agricultural chemicals, weeding, or threshing. Therefore, the customer may have advice of the farmer. For example, a tolerable range of growing parameters together with comments from the farmer may be given to the customer, when the customer instructs the farmer through the home page. The farmer may teach the customer an effect of excessive use of the agricultural chemicals on the growth of rice. Thus, the customer can have experiences not inferior to the farmer. Such experiences are useful in the coming year.

The instructions may be printed out by the farmer periodically or from time to time, from the beginning of the contraction.

For example, the instruction together with a sowing scene and its date may be sent to the customer by an electronic mail. The customer clearly knows that the farmer conducts operations according to the instructions.

The contents of the home pages are diversified, according to selected crops such as apple, cucumber, and potato. Further, the customer's experiences are enriched by farmer's advice for keys to success in growing each crop and fruit.

The customer may contract with the farmer year by year. Further, the cost may be displayed, every time when an instruction is issued by the customer, thereby enhancing reality of an experience of the customer, as if the customer were a real and expert farmer. Further, the customer may become aware of a balance of cost and performance, as if he/she were administrating and operating the farm.

When "cherry" is selected, the customer may go to see with his/her family or friends cherry-blossoms of the contracted cherry tree and to pick up cherries of the contracted cherry tree.

The customer has dealings with the farmer, by using electronic tools such as electronic mail, digital camera. It does not cost so much to introduce and use these tools.

Further, the customer enjoys a merit of getting fresh harvest at a low price directly from the contracted farmer, while the farmer enjoys a merit of stabilizing the management of the farm, because the contraction guarantees a constant income.

Further, the customer enjoys harvest in season.

Further, the harvest is not only agricultural crops, but also fishes such as eel, tuna, and sardine, crab, shell such as oyster. Particularly, it takes more than two years to harvest oyster. During that period of time, the customer instructs the growing condition and monitors periodically or from time to time the growing process which is not yet fully known. And, finally, the customer gets the grown-up oysters after a virtual experience.

A hen, pig, or horse may be grown for harvesting eggs, meat, or introduction to a horse race, respectively. The customer can confirm breeding process by electronic mails from the breeder attached with photographs of breeding scenes including the customer's instruction.

The present invention is also applied to pet animals such as dogs or cats. For example, a pet house may look after the pet animal during a travel of the customer. The pet house has to promise to send an electronic mail report to the customer, for example, once in three days. For this purpose, the customer reads the home page of the pet house and input a period for leaving the pet animal, a kind of care and cage. If the pet house can accept the conditions, the customer takes the pet animal to the pet house.

Then, the customer inputs contents of care instruction in prescribed section of the home page of the pet house, while the pet house transmits image data including the pet animal and the instruction for confirmation by the customer. Thus, the customer does not need to worry about the pet animal during the travel, while the pet house can do business, get satisfaction of giving the customer a mental stability, and find out a new method or know-how.

Video camera 8 may be controlled by control data to change a photographing direction and zooming. The photographed image is transmitted through the network to the customer terminal, thereby displaying the image.

The customer may select a menu to monitor the growing process all day long. When a control command is transmitted in accordance with prescribed codes, plants or animals are observed under the customer's control. The farmer can be controlled to a certain degree. Therefore, the customer's experience becomes more realistic.

The customer clicks the control code, by looking at a code table, or a menu screen, thereby switching on/off or adjusting function switches of video camera 8. The control code is transmitted through the Internet, converted into control data in the camera. A response signal may be transmitted from the camera in order to confirm the reception of the control code.

As the customer obtains the image by the control code, he/she can confirm an effectiveness of remote control and observe a realistic image.

On the other hand, management terminal 2 can save its trouble to transmit images of the scene of the farm and can concentrate on the farm.

In the above-explained embodiment of the present invention, the contents of farming experiences may be classified into a plurality of ranks, because the contents are diversified very much.

What is claimed is:

1. A network farming method comprising the steps of:

choosing an item to harvest from a farm network system;

inputting conditions for growing the item from a customer terminal connected to the farm network system;

growing the item according to the conditions for growing in the inputting step; and transmitting data from a farm terminal to the customer terminal regarding growth of the item, wherein said inputting step further comprises displaying costs to a user based on different growing conditions.

2. The method according to claim 1, wherein said choosing step includes choosing the item from one selected from an agricultural item, a horticultural item, a seafood item and a domesticated animal.

3. The method according to claim 1, further comprising the step of delivering the item to a customer at the customer terminal.

4. The method according to claim 1, further comprising the step of monitoring the growing process using a video camera having an output connected to the customer terminal.

* * * * *